United States Patent [19]

Hunaut et al.

[11] 4,437,110
[45] Mar. 13, 1984

[54] CONVERGENCE DEVICE FOR A COLOR-CAMERA

[75] Inventors: Roger Hunaut; Francois Dupont, both of Paris, France

[73] Assignee: Thomson-CSF, Paris, France

[21] Appl. No.: 341,179

[22] Filed: Jan. 20, 1982

[30] Foreign Application Priority Data

Jan. 23, 1981 [FR] France ................................. 81 01287

[51] Int. Cl.³ .......................... H04N 5/26; H04N 9/28
[52] U.S. Cl. ...................................... 358/41; 358/163; 358/164
[58] Field of Search .................... 358/41, 51, 163, 164, 358/220, 221, 222

[56] References Cited

U.S. PATENT DOCUMENTS

| | | | |
|---|---|---|---|
| 3,743,772 | 7/1973 | Pieters et al. | 358/163 |
| 3,869,567 | 3/1975 | Covington | 358/163 |
| 3,902,011 | 8/1975 | Pieters et al. | 358/163 |
| 4,285,004 | 8/1981 | Morrison et al. | 358/41 |

FOREIGN PATENT DOCUMENTS 3037330  4/1981  Fed. Rep. of Germany ........ 358/41

OTHER PUBLICATIONS

Recent Advances in Broadcast Camera Design, by John O. Ryan, Conference: International Broadcasting Convention, Brighton, England Sep. 20-23, 1980) pp. 27-30.

*Primary Examiner*—Tommy P. Chin
*Attorney, Agent, or Firm*—Cushman, Darby & Cushman

[57] ABSTRACT

A convergence device for a color camera having a correction memory for storing predetermined scanning correction signal values associated with each of the LN rectangles resulting from dividing the screen of the camera into L groups of N lines each and M columns, a sequencer for controlling the application of these correction signals to the camera scanner and an attenuator for attenuating the discontinuities existing between scanning correction signals associated with two adjacent lines of the same column.

7 Claims, 2 Drawing Figures

CONVERGENCE DEVICE FOR A COLOR-CAMERA

BACKGROUND OF THE INVENTION

The present invention relates to a convergence device for a color camera. It relates more particularly to a convergence device for a color camera in which the analysis of the image is achieved by combining a horizontal scanning movement and a vertical scanning movement adapted to each of the three fundamental colors.

Because of the separate processing for each of the three fundamental colors, it is generally difficult to obtain, on the fluorescent screen of the camera, perfect superimposition of the impact points of the electron beams corresponding to the three fundamental colors. This superimposition defect causes the presence of colored fringes on the contours of objects.

Traditionally, this defect of convergence of the electron beams is remedied by means of generators of signals, such as saw teeth, parabola, corner corrections etc. applied to the horizontal and vertical scanning means of the camera, and adjustable with potentiometers. These adjustments by means of potentiometers have the disadvantage of being long and tedious. Moreover, there always exists a residual error after adjustment.

SUMMARY OF THE INVENTION

The present invention aims at making these adjustments automatic and so at making them at one and the same time less tedious, more efficient and more reliable.

According to the invention the convergence device for a color camera in which the analysis of the image is achieved by combining a horizontal scanning movement and a vertical scanning movement provided by scanning means adapted to each of the three fundamental colors, comprises correction means for associating, with each of the LN rectangles resulting from dividing the screen of the camera into L groups of M lines each and N columns, a predetermined horizontal scanning correction signal and a predetermined vertical scanning correction signal adapted to each of two of the three fundamental colors, and a sequencer for controlling the application of these correction signals to the scanning means during the passage of the scanning means through the corresponding rectangles of the screen.

BRIEF DESCRIPTION OF THE DRAWINGS

The objects and features of the present invention will appear more clearly from the following description of embodiments, said description being made with reference to the accompanying drawings in which.

Identical elements in FIGS. 1 and 2 bear identical references.

DESCRIPTION OF THE PREFERRED EMBODIMENTS

Figure 1:
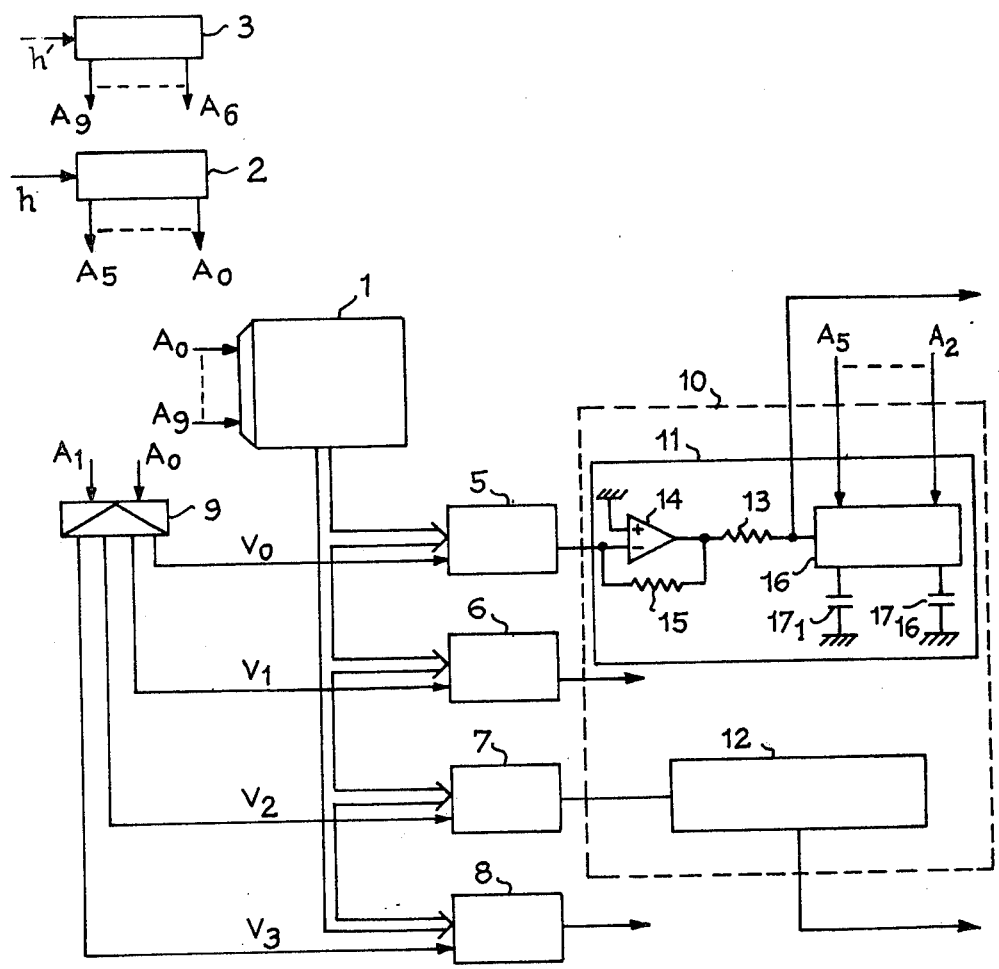
FIG. 1 is a diagram of a first embodiment of the invention, in a partially digital form.

The convergence device shown in FIG. 1 comprises a memory 1, so-called correction memory, for storing predetermined scanning correction voltage values associated with the different zones of the surface of the screen of the camera, and intended to be applied to the scanning means of the camera during the passage of the scanning means through these different zones. These different zones result from dividing up the surface of the screen into L groups of M lines each and N columns. With each of the LN rectangles thus defined are associated four predetermined correction voltage values, namely a horizontal scanning correction voltage and a vertical scanning correction voltage relative to two of the three fundamental colors, blue and red for example, the third fundamental color, green, serving as a reference.

By way of example, in the case of a 625 line image, the surface of the screen is divided up into 13 columns (N=13) and 14 groups of 20 lines each (L=14 and M=20).

The correction memory is then a memory of "4 LN" words of "x" bits in which are written the correction voltage values digitally coded on "x" bits. It is assumed by way of example that these values have been written sequentially and allocated, according to increasing writing priorities, with respect to the scanning direction, color type, column number and line group number. The address inputs of correction memory 1 are connected to the outputs $A_0$ to $A_5$ of a first addressing-reading counter 2, incremented by means of a clock signal "h" of frequency "4 Nf" ("f" designating the line scan frequency of the screen) and to the outputs $A_6$ to $A_9$ of a second addressing-reading counter 3 incremented by means of a clock signal h' of frequency "f'/M. The low weight bit $A_0$ serves for coding the scanning direction (horizontal or vertical), the next bit $A_1$ serves for coding the color type (blue or red), and within the limits of the previously chosen example for values L, M and N, the following bits $A_2$ to $A_5$ serve for coding the column number, and the following bits $A_6$ to $A_9$ serve for coding the line group number on which we happen to be located.

The outputs of the correction memory are connected to the data inputs of four digital-analog converters 5, 6, 7 and 8. Converter 5 is for example assigned to the vertical scanning means associated with the color blue, converter 6 to the horizontal scanning means associated with the color blue, converter 7 to the vertical scanning means associated with the color red and converter 8 to the horizontal scanning means associated with the color red.

A single one of these converters is enabled at a given moment, by means of a decoder 9 having two inputs connected to the low weight outputs $A_0$ and $A_1$ of counter 2, and four outputs connected respectively to the enabling inputs of converters 5 to 8 and providing respectively signals $V_0$ to $V_3$. The decoder 9 and the first and second counters 1 and 3 together form a sequencer.

The outputs of converters 5 and 7 associated with the vertical scanning means are connected to the inputs of the vertical scanning means through attenuation means 10 for attenuating the discontinuities existing between vertical correction scanning voltages. According to a preferred embodiment, the outputs of converters 6 and 8 associated with the horizontal scanning means are connected directly to the inputs of the horizontal scanning means, but attenuation means could also be inserted between converters 6 and 8 and the horizontal scanning means. Only means 11, for attenuating the discontinuities of the vertical scanning correction voltages, associated with the color blue, are shown in detail in FIG. 1, but means 12, for attenuating the discontinuities of the vertical scanning correction voltages, associated with the color red, are identical. Attenuation means 11 comprise a resistor 13 a first terminal of which is connected to the output of converter 5 through an operational amplifier 14 with feedback formed by a resistor 15. Attenuation means 11 also comprise analog demultiplexer 16 having a signal input connected to a second terminal of resistor 13, and control inputs connected to the outputs $A_2$ to $A_5$ of counter 2. The second terminal of resistor 13 forms the output of attenuation means 11, and so is connected to the input of the vertical scanning means associated with the color blue.

Within the limits of the embodiment described corresponding to the value N=13, demultiplexer 16 is provided with 16 outputs connected respectively to a first terminal of capacitors $17_1$ to $17_{16}$, the second terminal of capacitors $17_1$ to $17_{16}$ being grounded. More generally, demultiplexer 16 is provided with "N+3" outputs connected respectively to "N+3" capacitors, three additional outputs being in fact provided on the demultiplexer for the line suppression period.

The convergence device shown in FIG. 1 operates in the following way.

During each line scan period 1/f, i.e. for a given value of "l" ("l" being a whole number varying from 1 to L) and for a given value of "m" ("m" being a whole number varying from 1 to M), there are read out from the correction memory the four correction voltage values corresponding to each of the N columns. And for a given value of "n" ("n" being a whole number varying from 1 to N), these four values are applied successively to the data inputs of converters 5 to 8.

The analog converted horizontal scanning correction voltages may be applied as they are to the horizontal scanning means. In fact, the discontinuities existing between the horizontal scanning correction voltages associated with two adjacent lines of the same column are naturally attenuated because the horizontal scanning is privileged with respect to the vertical scanning, that is to say that scanning takes place along the lines. On the other hand, the discontinuities existing between the vertical scanning correction voltages relative to two adjacent lines of the same column cannot be attenuated in this way.

Now, these discontinuities cause sudden drawing together or moving away of the lines, which causes excessive brilliance or a black line at this location; this is a very troublesome defect which appears even for small voltage variations.

This is why the convergence device of the present invention comprises means for attenuating the discontinuities between vertical scanning correction voltages relative to adjacent lines of the same column, inserted between the digital-analog converters 5 and 7 associated with the vertical scanning means and the vertical scanning means.

These attenuation means are formed by filters of the "RC" type for smoothing the vertical scanning correction voltages. According to a preferred embodiment, with each column there is associated a filter having a different time constant, so as to increase the smoothing efficiency. In fact, with a single "RC" filter common to N columns, or even with N identical "RC" filters, the smoothing would be of good quality at the beginning of the line, but of a lower quality at the end of the line, whereas with N different "RC" filters, the quality of the smoothing is constant all along the line.

Figure 2:
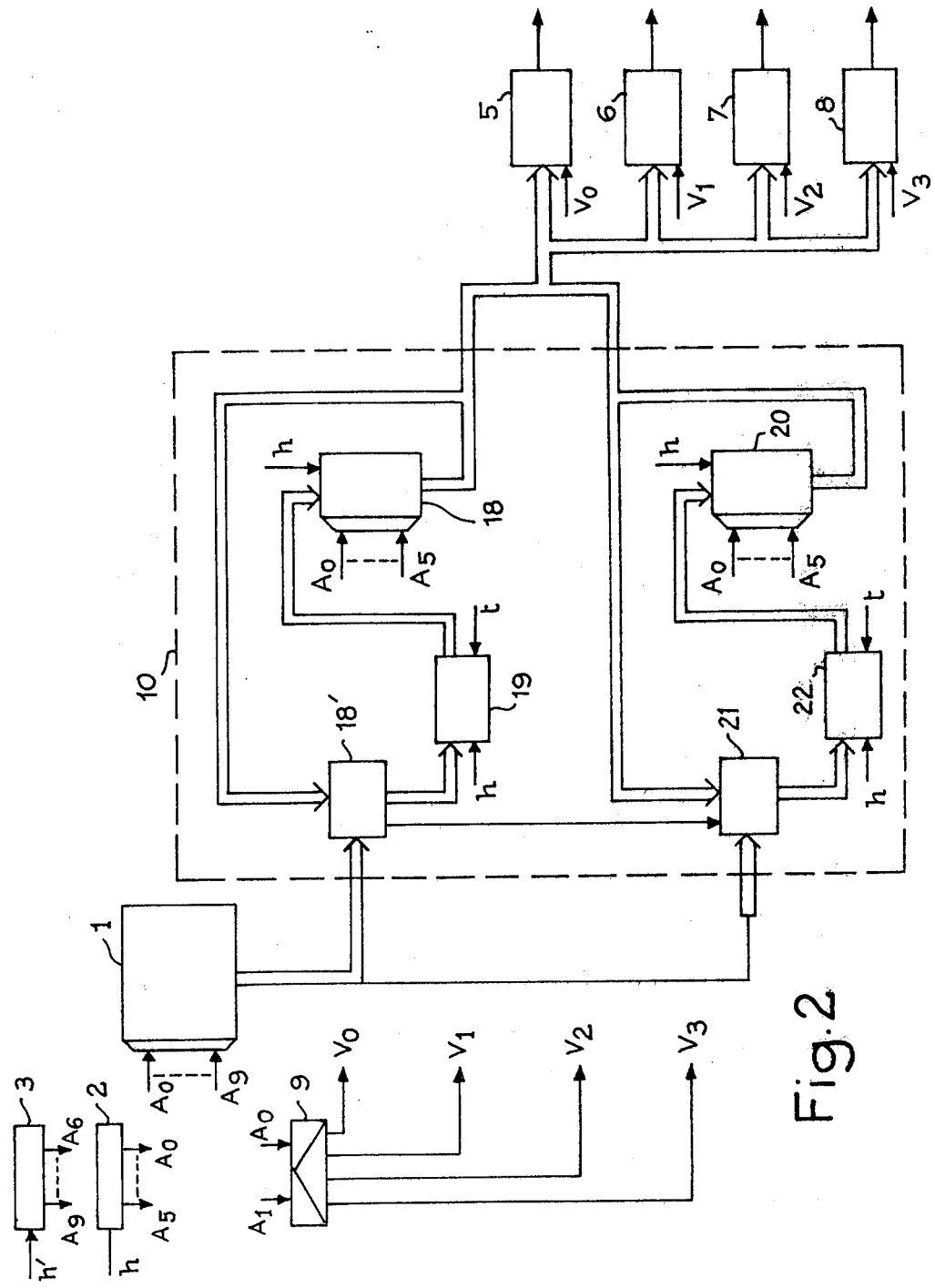
FIG. 2 is a diagram of a second embodiment of the invention, in an entirely digital form.

The convergence device shown in FIG. 2 differs from the one shown in FIG. 1 solely by the construction of the attenuation means. The attenuation means are this time constructed in digital form and, for this reason, the digital-analog converters associated with these attenuations means are inserted between the outputs of the attenuation means and the inputs of the scanning means.

Contrary to the analog construction, the discontinuities existing between horizontal scanning correction voltages associated with adjacent lines of the same column are also attenuated. In fact, this processing requires no additional equipment for digital operation, whereas for analog operation, the improvement in the quality of the image which would result therefrom would not compensate for the disadvantages resulting from the increase in equipment involved.

Attenuation means 10 comprise a memory 18, so called integration memory, of "4N" words of "x" bits and a first adder 18′, having first inputs connected to the outputs of correction memory 1, second inputs connected to the outputs of integration memory 18 and outputs connected to the data inputs of integration memory 18 through a first "x" bit register with parallel inputs and outputs.

Integration memory 18 is provided with address inputs connected to the outputs $A_0$ to $A_5$ of counter 2, and a reading-writing selection input which receives the clock signal "h" from counter 2.

Register 19 has a clock input which receives the clock signal "h" and a reset input which receives a signal "t" with a period equal to the total scanning time for the whole of the screen.

Attenuation means 10 also comprise a memory 20, so called resolution increase memory, of "4N" words of "y" bits ("y" being any whole number), a second adder 21 having "y" first inputs connected to the heavy weight output of correction memory 1, "y" second inputs connected to the outputs of resolution increase memory 20, a carry input connected to the carry output of the first adder 18′, and outputs connected to the data inputs of memory 20 through a second "y" bit register with parallel inputs and outputs.

The outputs of memories 18 and 20 are connected to the inputs of digital-analog converters 5, 6, 7 and 8, the outputs of memory 20 supplying the heavy weight bits.

The convergence device shown in FIG. 2 operates in the following way.

It will be assumed that counter 2 is responsive to the leading edges of its clock signal, that registers 19 and 22 are responsive to the trailing edge of their clock signal and that memories 18 and 20 are selected for reading when their reading-writing selection signal has a high logic level and for writing when this latter has a low logic level. Moreover, the reasoning relates to a scanning direction and to a given color.

For each value of "n" associated with a given value of "l", and during the period of the clock signal "h" corresponding to these two values, data are read out from memories 1 and 18 (at the address corresponding to the values of "l" and "n" for memory 1, and of "n" alone for memory 18) and added in adder 18′ during the first half-period, then written into memory 18, at the same address, during the second half-period.

This procedure is repeated for the L values of "l" associated with the value of "n" considered, the reading and writing taking place each time at the same address in memory 18, whereas the reading takes place at the "L" different addresses of memory 1 corresponding to the same value of "n".

Thus, integration is achieved, in the different line groups, of the correction voltages relating to the same scanning direction, to the same color, and to the same column, which is a way equivalent to filtering of attenuating the discontinuities existing between correction voltages.

The "y" first inputs of adder 21 each receive the heavy weight bit of the word provided by the correction memory for this allows the data supplied by correction memory 1 to be subtracted from the data supplied by juxtaposed memories 18 and 20, in the case where the heavy weight bit of the data supplied by correction memory 1 has a high logic level. It is in fact assumed that the heavy weight bits of the correction voltages stored in memory 1 indicate the sign of these correction voltages and that a high logic level designates a negative value.

The assembly formed by memory 20, adder 21 and register 22 is intended to increase the resolution of the system. In fact, the "x" bits supplied by memory 1 are added to the "x" low weight bits of the words of "x+y" bits supplied by juxtaposed memories 18 and 20. Since each correction voltage results in deflection of the spot, the contribution of each of these deflections to the total deflection resulting from the integration is thus weakened in a ratio $2^y$. This reduces the integration steps, i.e. increases the accuracy of the system, and thus improves the quality of the image.

What is claimed is:

1. A convergence device for a color camera having a screen divided into L groups of M lines each and N columns thereby forming LN rectangles, and horizontal and vertical scanning means adapted to each of the three fundamental colors, said convergence device comprising correction memory means storing 4LN words of "x" bits for associating, with each of the "LN" rectangles of the screen of the camera, a predetermined horizontal scanning correction signal and a predetermined vertical scanning correction signal adapted to each of two of the three fundamental colors, means for applying said scanning correction signals to said horizontal and vertical scanning means, sequencer means coupled to said means for applying for controlling the application of said correction signals to said horizontal and vertical scanning means adapted to said two fundamental colors, and attenuation means coupled to said means for applying and said scanning means for attenuating discontinuities existing between horizontal and vertical scanning correction signals associated with adjacent lines of the same column.

2. The device as claimed in claim 1, further including four digital analog converters located between the correction memory and the horizontal and vertical scanning means adapted to said two fundamental colors, and wherein the sequence comprises a first counter for addressing-reading the correction memory, incremented by a clock signal "h" of frequency "4Nf" ("f" designating the horizontal scan frequency of the screen of the camera), said first counter supplying a first bit for selecting a scanning direction, a second bit for selecting one of said two fundamental colors, and third bits for selecting one of said N columns, a second counter for addressing-reading the correction memory, incremented by a clock signal "h'" of frequency "f'/M, said second counter supplying bits for selecting one of said L groups of M lines, and a circuit for successively enabling the four digital-analog converters during each period of a clock signal of frequency "Nf".

3. The device as claimed in claim 2, wherein the successive enabling circuit comprises a decoder receiving said first and second bits, and enabling one of the four digital-analog converters.

4. The device as claimed in claim 2, wherein said attenuation means for attenuating discontinuities existing between correction signals relative to a given scanning direction and to a given color comprise "N" filters of "RC" type, formed from a resistor a first terminal of which is connected to the output of the digital-analog converter relative to said given scanning direction and to said given color, an analog demultiplexer whose signal input is connected to a second input of said resistor, and "N" capacitors a first terminal of which is connected to one of the "N" outputs of the analog demultiplexer and a second terminal of which is connected to a common reference voltage, the control inputs of said analog demultiplexer receiving said third bits.

5. The device as claimed in claim 4, wherein said "N" filters have different time constants.

6. The device as claimed in claim 2, wherein said attenuation means comprise an integration memory of "4N" words of "x" bits, having address inputs connected to the outputs of said first counter, and a reading writing selection input which receives the clock signal "h" and a first adder having "x" first inputs connected to the outputs of the correction memory, and outputs connected to the outputs of a first parallel input and output register itself having data inputs connected of a first parallel input and output register itself having data inputs connected to the outputs of said integration memory, a clock input which receives the clock signal "h" and a reset input which receives a signal having a period equal to the total scanning time of the screen of the camera, the outputs of said integration memory being furthermore connected to the data inputs of said digital analog converters.

7. The device as claimed in claim 6, in which the sign of the correction signal is coded on the heavy weight bit, wherein said attenuation means further comprise a resolution increase memory of "4N" words of "y" bits, addressed and selected for reading and writing like said integration memory, and a second adder having "y" first inputs connected to the heavy weight output of said integration memory, "y" second inputs connected to the outputs of said resolution increase memory, a carry input connected to the carry output of said first adder, and outputs connected to the data inputs of a second parallel input and output register controlled like the first register, and having outputs connected to the data inputs of said resolution increase memory, the outputs of said resolution increase memory being furthermore juxtaposed with the outputs of said integration memory so as to be connected to the data inputs of said digital-analog converters, the outputs of said resolution increase memory supplying the heavy weigh bits.

* * * * *